April 3, 1956 C. S. FULLER 2,740,700
METHOD FOR PORTRAYING p-n JUNCTIONS IN SILICON
Filed May 14, 1954
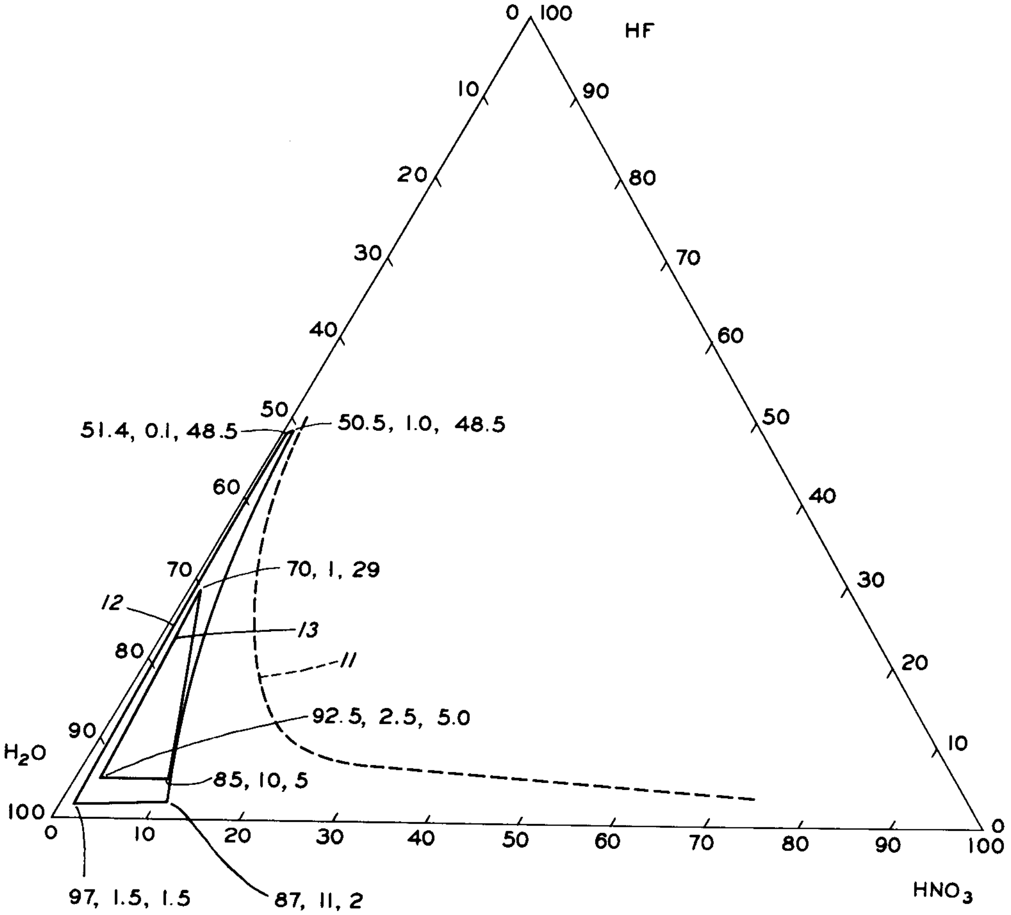
INVENTOR
C. S. FULLER
BY Arthur J. Torsiglieri
ATTORNEY United States Patent Office 2,740,700
Patented Apr. 3, 1956

2,740,700

METHOD FOR PORTRAYING P-N JUNCTIONS IN SILICON

Calvin S. Fuller, Chatham, N. J., assignor to Bell Telephone Laboratories, Incorporated, New York, N. Y., a corporation of New York Application May 14, 1954, Serial No. 429,820

6 Claims. (Cl. 41—42)

This invention relates to methods for determining the electrical characteristics of semiconductive silicon bodies and more particularly to methods for locating and portraying p-n junctions and resistivity gradients in such bodies.

In a number of signal translating devices which have been developed recently, a principal element is a body of purified silicon having therein two or more contiguous zones of opposite conductivity type, i. e., n- and p-type. Each pair of adjacent zones of opposite conductivity type defines therebetween what is termed a p-n junction, or simply a junction.

Many of the usual processes for preparing a highly purified silicon ingot provide an ingot which may include a mixture of p- and n-type regions with no visible lines of demarcation therebetween. Accordingly, before the silicon ingot can be used to form useful devices, it is important to delineate the p- and n-type regions, since in the construction of such devices it is important to locate precisely the location and orientation of the junctions. Moreover, since in many instances the suitability of a silicon body for use in translating devices is dependent upon the resistivity gradients extant in the body or at a particular region thereof, for example, adjacent a p-n junction therein, it is often desirable to ascertain the presence of such resistivity gradients.

One general object of the present invention is to facilitate the determination of the electrical characteristics of silicon bodies. More specific objects of the invention are to expedite the location of p-n junctions in silicon bodies, to provide a permanent marking thereof, and to simplify the ascertainment of resistivity gradients in such bodies.

Hitherto, it has been characteristic of the methods utilized for locating and marking junctions in silicon that they have involved as at least one of their steps either probing of the surface of the silicon for measuring electrical changes or applying electric potentials across the silicon body. These techniques are necessarily slow and inconvenient. A method of locating and marking which comprises instead immersing the silicon body in a suitable staining solution is of manifest utility because of its simplicity.

In accordance with an important feature of the present invention, a properly prepared silicon body is immersed in an aqueous staining solution in which silicon dioxide ($SiO_2$) is soluble but in which silicon monoxide (SiO) is relatively insoluble and which includes an oxidizing agent adapted to form a layer of silicon monoxide in a selective manner over the surface of the body to stain it accordingly.

To this end, the silicon body is immersed in an aqueous solution which includes nitric acid ($HNO_3$) and hydrofluoric acid (HF). Solutions of nitric acid and hydrofluoric acid have previously been used as etchants for silicon. In etching with such solutions, the nitric acid may be considered as continuously reacting with the silicon to form temporarily a layer of silicon dioxide which in turn goes into solution into the hydrofluoric acid. In etching, it is important to have a relatively high concentration of nitric acid in the solution. In the single figure of the drawing which is a ternary composition-by-weight diagram of aqueous solutions of nitric acid and hydrofluoric acid, the area included within the broken line 11 and the axis corresponding to the concentration of hydrofluoric acid represents in a gross sense the compositions of solutions generally used hitherto as etchants of silicon.

The broken line 11 is shown stopping short of the hydrofluoric acid axis since points being the ends of line 11 correspond to solutions of such high concentration of either nitric acid or hydrofluoric acid as not to be convenient for use.

However, in solutions suitable for staining silicon in accordance with the invention, it is important that the nitric acid concentration be kept sufficiently small that etching is substantially avoided. In particular, it has been discovered that if the nitric acid concentration is kept below a certain minimum with respect to the concentration of hydrofluoric acid, there is avoided appreciable formation of silicon dioxide on the surface of the silicon body and instead there is formed, preferentially on the p-type regions of the surface, a layer of silicon monoxide which is relatively insoluble in the solution of hydrofluoric acid.

In the composition diagram which forms the drawing, the compositions of solutions which at room temperature have been found primarily to stain are represented by the coordinates of the points within the closed area encompassed by the solid line 12. Because of the difficulty in handling of solutions more concentrated than 48.5 per cent hydrofluoric acid, no investigation has been made of such solutions. This area is seen to be substantially that included within the quadrilateral having as vertices the coordinates (51.4, 0.1, 48.5), (50.4, 1.0, 48.5), (97, 1.5, 1.5) and (87, 11, 2), where the ordinates represent the concentrations of water, nitric acid, and hydrofluoric acid, respectively.

However, the composition of solutions which are preferred for the practice of the invention in terms of convenience of ease of handling, the speed of staining, and the contrast provided correspond to the coordinates of the points within the closed area encompassed by the solid line 13. This area is that included within a triangle having as vertices (70, 1.0, 29), (92.5, 2.5, 5.0) and (85, 10, 5.0).

The coordinates of points in the intermediate region between the area enclosed by solid line 12 and the broken line 11 represents compositions in which either the staining process is so rapid and uncontrollable that the whole surface is darkened and too little contrast appears between n- and p-type regions or in which etching takes place so slowly as to be impractical for this purpose.

The silicon monoxide layer formed is dark in color. Since it is formed preferentially on the p-type regions of the surface, the p-type regions are more darkly colored and p-n junctions appear as contours. Moreover, p-type regions will be the more darkly colored the lower the resistivity, and to a lesser extent, where the staining solutions are high in total acid content n-type regions will be the more darkly colored the higher the resistivity. As a result, resistivity gradients show up as differences of shading.

The process has been applied to specimens of monocrystalline silicon prepared in a wide variety of ways, and it has been found to be independent of the manner of formation of the p-n junctions in the specimens. For example, it has proven equally successful in portraying p-n junctions formed in the specimen by doping the silicon melt in the course of growing the specimen from the melt, p-n junctions made by the diffusion of appropriate significant impurities into the silicon body, and p-n junctions formed by variable rate growing of the specimen. Usually, preliminary to staining it is desirable to section the silicon specimen to be investigated in a longitudinal direction (i. e. the direction of crystal growth) so that its interior may be studied.

Each surface to be examined advantageously is first ground to present a uniformly textured matte surface. The definition which is finally achieved depends to a large extent on the original surface texture, a high polish mechanically obtained being advisable for good resolution and sharp contrast. The surface preferably is prepared by grinding, with water as a vehicle, on waterproof silicon carbide abrasive paper, for example No. 400, or with polishing papers, depending on the degree of resolution desired in the final pattern. It has been found characteristic, however, that silicon surfaces which have previously been polished by etching with the usual etchants do not respond well to the staining process described. Accordingly, it is important to avoid previous etching of the surfaces to be studied.

The silicon specimen advantageously is rinsed in distilled water just before immersion in the staining solution and, while still wet, it is placed in the staining solution. This technique insures a complete wetting in the solution.

A staining solution of a quantity convenient for many applications and of a composition in the preferred range is prepared by mixing ten cubic centimeters of a dilute nitric acid solution, made up of one volume of 70 per cent nitric acid with four volumes of water, with 50 cubic centimeters of a concentrated 48.5 per cent hydrofluoric acid solution and 40 cubic centimeters of water. It will be appreciated by those familiar with the etching of silicon that the concentration of nitric acid in this staining solution is inadequate for etching.

The silicon body is immersed in the staining solution at room temperature. After some seconds of immersion, surface patterns begin to appear. Frequently, a "negative" image appears first, which later darkens into the final "positive" image in which the p-type areas are darkest. In other instances, only the "positive" image appears. Under favorable conditions while in the solution the p-type regions appear jet black and the n-type regions a shade of gray. After removal from the solution, the contrast is apt to be somewhat less. For the specific solution described, immersion for five minutes at room temperature brings out good contrast.

For the sharpest contrast for any one particular body, it may be advantageous to start with the silicon to be examined in a fairly concentrated hydrofluoric acid solution and to add the dilute nitric acid solution dropwise while the container is rocked to insure mixing. By closely watching the pattern develop, the process can be stopped at the point of optimum contrast and before etching begins. This method, however, is quite painstaking and also involves working with concentrations of hydrofluoric acid that are dangerous. Accordingly, when a large number of samples are to be marked quickly, it is preferable to immerse each in an aqueous solution of nitric acid and hydrofluoric acid prepared as described above.

Good contrast is achieved within one-half to ten minutes of immersion in such preferred solutions, depending on the characteristics of the silicon surface and the relative concentration of the nitric and hydrofluoric acids. In general, although longer periods of immersions, such as twenty minutes, may result in darker surfaces, the sharpest contrast between p- and n-type regions occurs for shorter periods of immersion. The optimum depth of contrast which can be attained also depends on the relative resistivities of the p- and n-type regions of the specimen. As indicated above, the definition depends to a large extent on the original surface texture, a high mechanical polish being advisable for sharp contrast at the junctions.

After immersion in the staining solution for the required time, the sample is withdrawn, rinsed in distilled water and blotted. The pattern sometimes appears dull to the naked eye, but under proper illumination and about ten to fifty times magnification excellent detail can be seen. The process described has been utilized successfully to locate p-type regions about a mil wide in preponderantly n-type specimens. The finished patterns are not easily damaged and last long periods of time in air at ordinary room temperatures.

If the surface of the silicon body becomes too dark because of overextended immersion, the surface can be reground to remove the silicon monoxide coating and the staining process can be started anew.

It is believed that the selective staining of the p-type regions involves an electrochemical oxidation and reduction reaction in which the silicon of p-type reacts more readily than that of n-type because of the greater free energy of reaction of the p-type material. The electrons given up by the p-type silicon in this reaction must, however, be balanced by positive holes flowing from the n-type regions. Since this is the high resistance direction for the junctions formed between p- and n-type regions, the reaction requires current leakage over the surface. Because such leakage is enhanced by mechanically polishing the surface and reduced by surface etching, it is advantageous to polish mechanically the surface to be examined. Moreover, because of the electrochemical nature of the staining process, it is important to avoid supporting the silicon body by conductive material while it is immersed in the staining solution.

It is also in the nature of the process that other oxidizing agents may be substituted for the nitric acid in the staining solution, although none has been found that functions equally well. Oxidizing agents found operative include sodium nitrate, ferric sulphate, iodine and bromine.

What is claimed is:

1. A method for portraying *p-n* junctions in a silicon body which comprises the step of immersing the silicon body in an aqueous staining solution of hydrofluoric acid and nitric acid, the composition by weight of the solution being representable on a ternary composition diagram by a point within the area encompassed by a quadrilateral having vertices approximately at coordinates (97, 1.5, 1.5), (51.4, 0.1, 48.5), (50.5, 1.0, 48.5) and (87, 11, 2.0) where the first ordinate represents the percentage concentration of water, the second that of nitric acid, and the third that of hydrofluoric acid.

2. A method for portraying *p-n* junctions in a silicon body which comprises the step of immersing for from one-half minute to ten minutes the silicon body in an aqueous staining solution of hydrofluoric acid and nitric acid, the composition by weight of the solution being representable on a ternary composition diagram by a point within the area encompassed by a triangle having vertices approximately at coordinates (92.5, 2.5, 5.0), (70, 1.0, 29) and (85, 10, 5.0) where the first ordinate represents the percentage concentration of water, the second that of nitric acid, and the third that of hydrofluoric acid.

3. A method for portraying *p-n* junctions in silicon bodies in accordance with the method of claim 1 with a preliminary step of abrading the surface of the silicon body before its immersion in the aqueous staining solution.

4. A method for portraying *p-n* junctions in silicon bodies in accordance with the method of claim 2 with a preliminary step of abrading the surface of the silicon body before its immersion in the aqueous staining solution.

5. A method for portrayng *p-n* junctions in a silicon body which comprises the steps of mechanically polishing the surface to be investigated of the silicon body, rinsing the silicon body in distilled water, and while still wet immersing it in a staining solution consistng of water, hydrofluoric acid and nitric acid for a length of time sufficient to stain selectively the p-type surface regions.

6. A method of portraying *p-n* junctions in a silicon body which comprises the steps of mechanically polishing the surfaces to be examined of the silicon body, immersing the specimen in an aqueous solution including an oxidizing agent adapted to form a layer of silicon monoxide preferentially on the p-type regions of the surface and further characterized in that silicon dioxide is soluble therein while silicon monoxide is insoluble for a length of time sufficient to stain selectively the p-type surface regions.

References Cited in the file of this patent

UNITED STATES PATENTS

| | | |
|---|---|---|
| 2,419,237 | Treuting | Apr. 22, 1947 |
| 2,583,681 | Brittain et al. | Jan. 29, 1952 |
| 2,602,763 | Scaff et al. | July 8, 1952 |
| 2,619,414 | Heudebreucg | Nov. 25, 1952 |